United States Patent Office 3,063,799
Patented Nov. 13, 1962

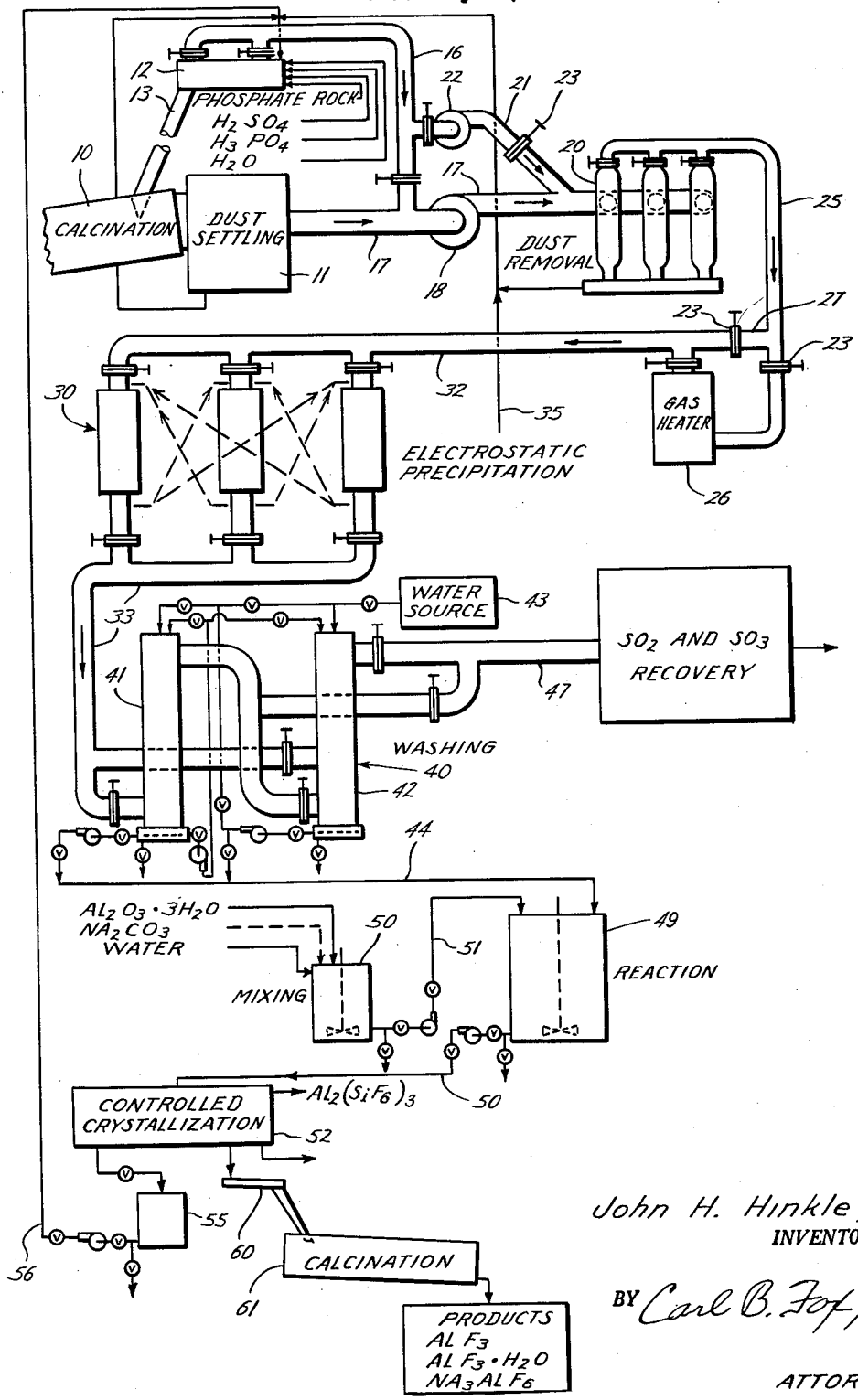

3,063,799
ALUMINUM AND SODIUM ALUMINUM
FLUORIDES
John H. Hinkle, Jr., Harris County, Tex., assignor, by mesne assignments, to Hooker Chemical Corporation, New York, N.Y., a corporation of New York
Filed May 25, 1960, Ser. No. 31,673
7 Claims. (Cl. 23—88)

This application pertains to processes for the manufacture of aluminum fluorides and sodium aluminum fluorides. The processes according to the invention are adapted to the recovery of fluorine from "waste" gas streams containing fluorine and compounds thereof as components, but the processes are equally suitable for use should it be desired to vaporize fluorine, or its compounds, in order to utilize the processes.

A principal object of the invention is to provide processes for the manufacture of aluminum fluorides and sodium aluminum fluorides.

Another object of the invention is to provide such processes wherein recovery of valuable fluorine components from "waste" gases is achieved.

Further objects of the invention are to provide methods for preventing fluorine and its compounds from being introduced into the atmosphere with stack gases, to achieve recovery of the fluorine in valuable form, and to improve plant operational economics.

The processes according to this invention involve treatment of fluorine-containing gases to produce, usually, aluminum fluoride ($AlF_3$), aluminum fluoride monohydrate ($AlF_3 \cdot H_2O$), or sodium aluminum fluoride ($Na_3AlF_6$), also known as synthetic cryolite.

Suitable gases from chemical processing plants, such as in the phosphate and aluminum industries, wherein fluorine is some form is normally produced in gases vented to the atmosphere, may be treated, or fluorine bearing gases may be prepared and then treated, according to the invention.

The processes include the steps of removing undesirable constituents from the gases, if necessary, by first mechanical and then electrical precipitation procedures, washing the fluorine constituents from the gases, reacting the wash liquor with a suitable agent depending on the product desired, separating the product in substantially pure form by selective controlled crystallization, and finally calcining the product to control its moisture content.

It has been found that a substantially complete separation of fluorine and sulphur constituents of gases may be obtained in the washing stage of the processes, rendering the processes particularly useful for treatment of the waste gases encountered in plants for acidulation ($H_2SO_4$) treatment of phosphate minerals. Further, it has been found that separations between aluminum sulphate ($Al_2(SO_4)_3$), aluminum silicofluoride ($Al_2(SiF_6)_3$), and aluminum fluoride hydrate ($Al_2F_6 \cdot 7H_2O$, also written: $AlF_3 \cdot 3\frac{1}{2}H_2O$), or cryolite ($Na_3AlF_6$, also written: $AlF_3 \cdot 3NaF$), may be made by controlled selective crystallizations, the separated aluminum fluoride hydrate being converted to product $AlF_3$ or $AlF_3 \cdot H_2O$ by suitable calcination, the cryolite being dried by calcination.

Other objects and advantages of the invention will appear from the following detailed description of preferred embodiments thereof, reference being made to the accompanying drawing showing a schematic flow diagram of processes according to the invention in one preferred form.

Referring to the drawing, and first directing the description to processes for manufacturing $AlF_3$ or $AlF_3 \cdot H_2O$, there is included, for illustrative purposes, a partial showing of a plant having as its product defluorinated tricalcuium phosphate of the type used as a mineral supplement for feeding animals. Of this plant, there is shown in the drawing the end of a kiln 10, a dust chamber 11 connected with the kiln, a mixer 12 the discharge of which is led through a chute 13 into the kiln to be calcined. Between mixer 12 and kiln 10, in such plants, there is invariably interposed means for holding or "denning" the mixed material before calcination, a showing of which is not necessary to this disclosure. The "break" in chute 13 indicates the possible inclusion of such means.

In mixer 12, mineral phosphate rock, such as for example Florida land pebble consisting mainly of the mineral apatite (designated by chemical formula as $(CaF)Ca_4(PO_4)_3 \pm Cl$, or the like), sulphuric acid ($H_2SO_4$), phosphoric acid ($H_3PO_4$) and, usually, water, are mixed to form a thickened slurry or cake comprising a mixed partially interreacted mass of the designated raw materials, having a form from "soupy" to substantially dry cake.

This mass, whether detained for further interreaction or not, is in due course fed through the lower end of chute 13 into kiln 10, or the like, to be subjected to calcination at a temperature, say, between 1800° or 1900° F. to 2600° or 2800° F. The calcined material, after grinding and screening, or the like, if necessary, is the defluorinated tricalcium phosphate mineral supplement primarily used as an additive to livestock and poultry, and other animal, feeds.

Duct 16 leading from one or more outlet from mixer 12 provides means for removal of gases produced by the chemical reaction from the mixer. These gases usually contain sulphur dioxide ($SO_2$), silicon tetrafluoride ($SiF_4$), hydrofluosilicic acid ($H_2SiF_6$), hydrogen fluoride (HF), steam ($H_2O$), air, in varying concentrations, and perhaps also traces of sulphur trioxide ($SO_3$), and are usually at a somewhat elevated temperature because the chemical reaction is exothermic.

From kiln 10, flue gases and gaseous and vaporous materials resulting from calcination, and dust (tricalcium phosphate, $SiO_2$, etc.) carried in suspension thereby from the kiln, flow into dust chamber 11 wherein the gas flow velocity is reduced to allow partial settling of the dust. Duct 17, with which duct 16 is interconnected, carries the kiln gases from the dust chamber. The kiln gases include sulphur dioxide ($SO_2$), sulphur trioxide ($SO_3$), steam ($H_2O$) silicon tetrafluoride ($SiF_4$), hydrofluosilicic acid ($H_2SiF_6$), hydrogen fluoride (HF), carbon dioxide ($CO_2$) from kiln fuel combustion, and air in varying amounts, together with dust not removed in the dust chamber.

Duct 17 leads through blower 18 into one or more dust separation means 20, which may be any of the available high-efficiency types such as high velocity cyclones and/or bag filters, to remove substantially all of the remaining suspended dust.

Duct 21 leading from duct 16 to dust separation means 20 may be used to flow mixer gases directly to dust separation means 20, by-passing blower 18, if desired, dust 21 also being provided with a suitable blower 22 to cause appropriate gas movement.

Ducts 16, 21, and other ducts yet to be mentioned, are provided with the gate closures 23, or other suitable closures, as required to control gas flow, the closures being indicated similarly throughout the drawing.

The dust collected at dust separators 20 is moved to mixer 12.

Duct 25 leads the substantially dust-free gases from dust separation means 20 to gas heater 26, which may be by-passed if desired through duct 27 which as indicated includes a gate closure 23 which is normally closed. Heater 26 is usually required in order that the temperature of the gases will be sufficiently elevated to prevent undesirable condensations of water and salts from the gas stream during electrostatic precipitation therefrom in unit 30. A sufficiently elevated temperature imparted to the gases by heater 26 will, in the presence of water vapor, convert the $H_2SiF_6$ to $SiO_2$ and HF, according to the equations:

$$H_2SiF_6 + 2H_2O \xrightarrow{(heat)} SiO_2 + 6HF$$

and $$SiF_4 + 2H_2O \xrightarrow{(heat)} SiO_2 + 4HF$$

While dust separators 20 remove substantially all of the dust content from the gas stream, there remains in the gas stream flowing through duct 25 a small amount of residual dust of extremely fine particle size, in the nature of a "fog" or "haze." The gases in duct 25, if admitted to the atmosphere without further treatment, would create a plume or haze of bluish tint. This finely divided dust is composed primarily of calcium sulphate hydrates, such as gypsum ($CaSO_4 \cdot 2H_2O$), calcium phosphates, and silica ($SiO_2$), all in extremely finely divided form. The calcium phosphates include the mono-, di-, and tricalcium phosphate forms, because of the various degrees of reaction of the acidulated rock, as is well known in the art. The state of subdivision of these materials, to produce a haze effect, is probably of the colloidal range, such material being of the class of materials termed "erosols." It is likely that the materials here under discussion are formed by condensation phenomena and are "smokes" in the colloid chemists' definition thereof, it appearing likely that smokes are produced either by rapid condensation from the vapor state by cool air leakage into the process flow streams and/or by chemical reaction of vapor or liquid substances with resultant condensation of the solid products. Colloid smokes are commonly formed by either of these phenomenon.

Electrostatic precipitation of such a smoke at low temperatures, especially in the presence of water vapor, would cause rapid growth of impure agglomerates of all of the substances present therein, likely accompanied by fouling of the equipment. However, by maintaining elevated temperatures during electrostatic precipitation, such rapid agglomeration is prevented with the result that fouling of the equipment is avoided and selective separate precipitations of certain of the smoke constituents in substantially pure form can be attained. This separation has been found to be possible since the calcium sulphate and calcium phosphate constituents of the smoke are of larger partical size (and mass) than the silica. Thus, at relatively lower electrostatic potentials the calcium sulphate and phosphate constituents can be first selectively removed from the gas stream in one stage, leaving the bulk of the silica in the gas stream, and then the silica can be precipitated in substantially pure form at relatively higher electrostatic potentials in another stage. The efficiency of separation, and the purity of the silica product, can be improved by use of plural stages for precipitation of the calcium sulphates and phosphates, and by internal partition of the stages whereby a plural stage separation is obtained in each precipitator.

There is a difference in behavior between the calcium sulphates and phosphates, and silica, when they are precipitated electrostatically in the usual types of equipments. The calcium sulphates and phosphates, when adhered to the collector screens of such equipment, are easily removed therefrom by "rapping" or other shock imparted to the screens. On the other hand, silica tends to adhere strongly to the collector screens and more pronounced rapping of the screens, or physical means such as scraper or brush, must be applied to secure removal of the silica. Therefore, it will in most cases be found to be necessary to operate the electrostatic precipitation equipment cylically, at least with regard to such equipment as is used for silica collection, in order to provide down-time for removal of silica from the collector screens.

Duct 32 carries the heated gases from heater 26 to the electrostatic precipitation equipment 30. The precipitation equipment is arranged such that the heated gases may be delivered to any of the precipitator stages, and so that gas from any precipitator stage may be delivered to any other precipitator stage, and so that any precipitator stage may be taken out of use for removal of collected silica, for cleaning, or for repair. The gases after precipitation therefrom are delivered through duct 33. The manifold ducts of the precipitation unit include valves 23 as indicated and as necessary to direct gas flow as desired.

Dust collected at each precipitation stage may be delivered to mixer 12 as indicated by line 35 or may be recovered as a product material, as indicated in the drawing. The calcium sulphates and phosphates will most always be recycled to mixer 12. All or part of the silica may be recycled to mixer 12 if the process of which mixer 12 forms a part so requires. However, the silica is a valuable by-product material of high sale value and demand, so that it is economically advisable to recover as much as possible of the silica for sale.

The recovered silica is of a purity in the range, 90–95% $SiO_2$, by weight, which is exceptionally pure, is of a white color usually unattained in silica products, and its extreme state of subdivision is of commercial advantage. The silica product is a lightweight, non-dense, free-flowing material.

The clean gases delivered from the electrostatic precipitation unit 30 through duct 33 are next passed into a scrubbing or washing unit 40. Unit 40 is shown to include two packed or spray towers 41, 42, but any other suitable equipment may be substituted. As shown, towers 41, 42 may be utilized separately, serially or parallely. Water from source 43 is passed downwardly through the towers. Preferably, fresh water from source 43 is introduced to tower 42, recycled in tower 42, bled off to tower 41, and recycled in tower 41, before being taken off through pump and valve equipped line 44. However, as is clearly shown in the drawing either tower may be employed separately, with or without recycle of the scrubbing liquor.

The wash liquor passing from the scrubbing unit through line 44 contains substantially all of the fluorine components of the gases introduced to towers 41, 42 through duct 33. The washed gases exited from the scrubbing unit through duct 47 contain substantially all of the sulphur components of the gases introduced to towers 41, 42 through duct 33. Even though the scrubbing liquor is permitted to build up to concentrations up to about 25%F, it is significant that only traces of HF remain in the washed gases. Even more significant, the scrubbing liquor withdrawn from the towers contains no sulphur components detectible by usual laboratory determinations. Thus, the separation between sulphur and fluorine is exceedingly complete and entirely satisfactory. Non-ionic detergents are added to the wash liquor to reduce surface tension below about 45 degrees. This causes rapid settling of solids caught in the tower and simplifies recirculation thereof to mixer 12.

The washed gases in duct 47 are delivered to a sulphur recovery system for recovery as sulphuric acid. Usually the washed gases are further washed with sulphuric acid, primarily to dry the gases, then sent to a mist eliminator for removal of entrained acid mist, and then passed to the catalytic (platinum or vanadium) conversion unit of a conventional sulphuric acid manufacturing process. The sulphur gases treated by such process may be augmented by a sulphur burner. There are no materials in the gases hereby provided which adversely affect operation of such a sulphuric acid process. Traces of fluorine in the gases have no adverse effect.

The scrubbing liquor passed out through line 44 is discharged to a reaction zone 49, or tank, wherein chemicals are added to cause precipitation of the fluorides. A water suspension of the chemicals, either alumina hydrate ($Al_2O_3 \cdot 3H_2O$) or alumina hydrate and a sodium salt such as sodium carbonate ($Na_2CO_3$), depending on the product desired, is prepared in a receptable or tank 50 and delivered through line 51 into tank 49. Line 51 is suitably provided with valves and pump as shown in the drawing. The concentration of the reactant suspension is not critical.

If the product desired is either aluminum fluoride (anhydrous) or aluminum fluoride monohydrate, then only alumina hydrate is used to make the reactant solution in tank 50. The fluorine being present in the scrubbing liquor in tank 49 as hydrofluoric acid, the chemical reaction occurs according to the following equation:

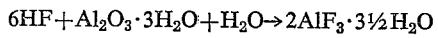

$$6HF + Al_2O_3 \cdot 3H_2O + H_2O \rightarrow 2AlF_3 \cdot 3\tfrac{1}{2}H_2O$$

On the other hand, if the product desired is synthetic cryolite, then a sodium material such as sodium carbonate is added to tank 50 along with alumina hydrate, and the chemical reaction in tank 49 occurs according to the following equation:

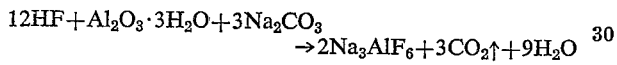

$$12HF + Al_2O_3 \cdot 3H_2O + 3Na_2CO_3 \rightarrow 2Na_3AlF_6 + 3CO_2\uparrow + 9H_2O$$

For each product, the reacted slurry in reactor 49 is delivered hot through pump and valve equipped line 50 to controlled crystallization unit 52. In unit 52, the substances forming the slurry are separated by controlled stage crystallizations. The crystallizations will preferably be of the vacuum or other efficient type. By the first crystallization stage, any $Al_2(SiF_6)_3$, which is relatively insoluble, may be removed. Only slight cooling is necessary to remove this phase. Then, in a second crystallization stage, the $AlF_3$ components are separated out. The remaining liquor may, but usually doesn't, contain some $Al_2(SO_4)_3$, which may be separated by a final crystallization stage, but is usually drained to a recycle tank 55 for return via pump and valve equipped recycle line 56 which returns the liquor to mixer unit 12.

A conveyor 60 moves the $AlF_3 \cdot 3\tfrac{1}{2}H_2O$ (or $Na_3AlF_6$) crystals from unit 52 to a heating or calcination apparatus 61 wherein dehydration and/or drying of the products is accomplished. $AlF_3 \cdot 3\tfrac{1}{2}H_2O$ may be calcined to form either $AlF_3$ or $AlF_3 \cdot H_2O$ as the product, depending on the degree of calcination. $Na_3AlF_6$ is dried by the calcination.

Other products than those specifically described may be prepared by suitable alterations of the chemical reactants added in reactor 49, among these being sodium and calcium fluoride products, the former involving use of a sodium material alone in reactor 49 and the latter, a calcium material such as lime.

The apparatus described in connection with the methods is not intended to limit the methods, and other suitable apparatuses may be employed.

While preferred embodiments of the invention have been shown and described, many modifications thereof may be made by a person skilled in the art without departing from the spirit of the invention, and it is intended to protect by Letters Patent all forms of the invention falling within the scope of the following claims.

I claim:

1. Method for treating mixtures of waste gases and suspended solids, said mixtures being obtained from acidulation and/or calcination of phosphatic minerals, to recover valuable products therefrom, said gases being at elevated temperature and including at least one of the gases sulphur dioxide and sulphur trioxide, and at least one of the gases, silicon tetrafluoride, hydrofluosilicic acid and hydrogen fluoride, and suspended solids including silica and at least one solid of triacalcium phosphate and calcium sulphate hydrates, comprising the steps:

(1) separating the bulk of the suspended solids from said gases; and then, said gases still being at elevated temperature, (2) electrostatically removing substantially all of the remaining suspended solids from said gases; and then, (3) water washing said gases to dissolve and separate the water soluble fluorine components; and then (4) converting all of the sulphur components of the gases, after said washing thereof of step (3), to sulphur trioxide; and, (5) precipitating said water soluble fluorine components from the water solution resulting from washing step (3).

2. Method for preparing silica, sulphuric acid and aluminum salts from waste gases obtained from acidulation and/or calcination of phosphatic minerals which include silica in finely-divided gasiform suspension, which include sulphur in at least one of the forms, sulphur dioxide and sulphur trioxide, and which include fluorine in at least one of the water soluble forms, silicon tetrafluoride, hydrofluosilicic acid, and hydrogen fluoride, comprising the steps:

(1) electrostatically precipitating said silica from said waste gases at elevated temperature to produce a dry silica product; and then, (2) water washing said gases from which the silica has been removed according to step (1) to dissolve said fluorine therefrom and withdrawing the wash water; and (a) precipitating said dissolved fluorine by addition, to the withdrawn wash water of step (2), of a reagent comprising an aluminum-containing precipitant; and (b) separating and recovering said precipitated fluorine; and also, (c) catalytically oxidizing all of the sulphur components of said washed waste gases to sulphur trioxide, and recovering the sulphur trioxide as sulphuric acid.

3. Method of claim 2, including converting said $H_2SiF_6$ and $SiF_4$ in said gases to $SiO_2$ and HF prior to said electrostatic condensation by maintaining said gases at a sufficiently elevated temperature.

4. Method of claim 3, including adding an alumina to said wash water containing said fluorine in solution to precipitate an aluminum fluoride, and separating said aluminum fluoride by crystallization.

5. Method of claim 3, including adding an alumina and a water soluble sodium salt to said wash water containing said fluorine in solution to precipitate synthetic cryolite, and separating said synthetic cryolite by crystallization.

6. Method of claim 3 wherein said waste gases contain phosphate impurities in suspension, and wherein said impurities are separated from said silica by selective electrostatic condensation of the silica therefrom.

7. Method for treating mixtures of waste gases and suspended solids, said mixtures being obtained from acidulation and/or calcination of phosphatic minerals, to recover valuable products therefrom, said gases being at elevated temperature and including at least one of the gases sulphur dioxide and sulphur trioxide, and at least one of the gases, silicon tetrafluoride, hydrofluosilicic acid and hydrogen fluoride, and suspended solids including silica and at least one solid of tricalcium phosphate, calcium sulphate hydrates, monocalcium phosphate and dicalcium phosphate, comprising the steps:

(1) separating the bulk of the suspended solids from said gases; and then, said gases still being at elevated temperature, (2) electrostatically removing substantially all of the remaining suspended solids from said gases; and then,
(3) water washing said gases to dissolve and separate the water soluble fluorine components; and then
(4) converting all of the sulphur components of the gases, after said washing thereof of step (3), to sulphur trioxide; and,
(5) precipitating said water soluble fluorine components from the water solution resulting from washing step (3).

References Cited in the file of this patent

UNITED STATES PATENTS

| | | |
|---|---|---|
| 1,896,287 | Clark | Feb. 7, 1933 |
| 2,231,309 | Weber | Feb. 11, 1941 |
| 2,655,431 | Allen et al. | Oct. 13, 1953 |
| 2,813,000 | Quittenton | Nov. 12, 1957 |
| 2,819,151 | Flemmert | Jan. 7, 1958 |
| 2,912,342 | Fetterolf | Nov. 10, 1959 |
| 2,920,045 | Hearn et al. | Jan. 5, 1960 |
| 2,920,938 | Matoush | Jan. 12, 1960 |
| 2,943,914 | Moser | July 5, 1960 |